United States Patent [19]

Cobbs, Jr. et al.

[11] Patent Number: 4,608,398

[45] Date of Patent: Aug. 26, 1986

[54] FOAMABLE THERMOSETTING COMPOSITIONS AND METHODS OF COATING THEREWITH

[75] Inventors: Walter H. Cobbs, Jr., Amherst, Ohio; Robert G. Shong, Houston, Tex.; William R. Rehman, Vermilion, Ohio

[73] Assignee: Nordson Corporation, Amherst, Ohio

[21] Appl. No.: 557,639

[22] Filed: Dec. 2, 1983

Related U.S. Application Data

[60] Continuation-in-part of Ser. No. 327,025, Dec. 3, 1981, abandoned, which is a division of Ser. No. 161,135, Jun. 19, 1980, abandoned, which is a division of Ser. No. 842,265, Oct. 14, 1977, Pat. No. 4,247,581.

[51] Int. Cl.[4] .................... C08J 9/00

[52] U.S. Cl. .................... 521/113; 521/78; 521/115; 521/117; 521/138; 521/178

[58] Field of Search .................... 521/113, 115, 96, 138, 521/178, 78, 117

[56] References Cited

U.S. PATENT DOCUMENTS

| | | | |
|---|---|---|---|
| 4,139,501 | 2/1979 | Rudner et al. | 521/115 |
| 4,143,029 | 3/1979 | Matthews et al. | 521/115 |
| 4,147,678 | 4/1979 | Mao et al. | 521/115 |
| 4,369,258 | 1/1983 | Johnson | 521/115 |
| 4,374,207 | 2/1983 | Stone et al. | 521/113 |
| 4,482,651 | 11/1984 | Reichel et al. | 521/115 |

*Primary Examiner*—Morton Foelak

*Attorney, Agent, or Firm*—Wood, Herron & Evans

[57] ABSTRACT

Surface coating methods and compositions are disclosed which eliminate many of the disadvantages associated with known coating processes from pollution, equipment, materials, energy, labor and cost standpoints. According to techniques described, thermosetting liquid compositions containing film-forming solids are formulated, then conveyed in the foam state toward a surface, and upon foam disintegration, form a film of solids on the surface. The foamable thermosetting resin compositions contain a curable resin having a free hydroxyl or carboxyl group, a curing agent consisting of a lower ($C_1$–$C_4$) alkoxylated amine for reaction with the resin hydroxyl or carboxyl group and a liquid blowing agent consisting of a $C_1$–$C_4$ alkanol which is also a by-product of the thermosetting reaction.

6 Claims, 2 Drawing Figures

FOAMABLE THERMOSETTING COMPOSITIONS AND METHODS OF COATING THEREWITH

RELATED APPLICATION

This application is a continuation-in-part of application Ser. No. 327,025, filed Dec. 3, 1981, now abandoned which in turn is a divisional of application Ser. No. 161,135, filed June 19, 1980, now abandoned which in turn is a divisional of application Ser. No. 842,265, filed Oct. 14, 1977, now U.S. Pat. No. 4,247,581, issued Jan. 27, 1981.

BACKGROUND OF THE INVENTION

Surface coatings originated in the Stone Age. Paint was first used by early Egyptians who dispersed pigment in a binder such as egg white. Today, paint is still basically a uniform dispersion of a binder or vehicle and a pigment. The vehicle is usually made up of a film-forming component, such as a resin; the vehicle is thinned with a solvent. With the exception of a minor percentage of powdered and curable solid surface coatings, currently the coating and finishing industry is predominantly based upon solvent-containing coatings.

The coating and finishing industry has, however, focused with great intensity upon its operations and their effect upon man's environment. Present coating techniques tend to create odors, smog, health and safety hazards. Legislation toward reducing such hazards at all levels of coatings manufacture and use is well advanced and enforced. However, compliance is not resulting in substantial changes in types of coatings used, rather, coatings are almost exclusively based on the solvent systems. Perhaps the most serious concern of the industry today, from a standpoint of both raw materials and environmental control, is the solvent components of the paint. Related concerns are the high price of energy, labor costs and capital in converting paints and liquid coatings into useful films.

The problems of the industry are illustrated by the commonly employed processes of liquid spray-coating, electrostatic liquid spray-coating and electrostatic powder-coating. In the spray-coating application of a resinous material, it is usual to dissolve the resinous material in an organic solvent to provide a suitable viscosity for spraying. Such methods of spraying solvent mixtures of film-forming resinous materials require significant amounts of solvent and lose solvent in handling, coating and finishing useful articles. Electrostatic liquid spray-coating techniques have been employed for coating normally liquid materials, i.e., paints or solvent coatings which have been atomized by air, airless or centrifugal atomization techniques. With respect to each of the spray-coating techniques, it is therefore common practice to dissolve a film-forming solid in an organic solvent to allow the composition to be handled, atomized and deposited upon the article to be finished. In fact, in known liquid spraying techniques, it is usually essential to use a solvent for the resinous coating composition in order to obtain a satisfactorily sprayed coating. During handling, atomization or deposition of solvent coating compositions, solvents will escape, and if not effectively trapped, the solvents will become air contamination. Even after a solvent coating is spread or applied to the article, solvents leave or escape from the coating film by evaporation and these too become contaminants of the surrounding atmosphere. Furthermore, since most solvents react with oxidants, they contribute to the pollution problems not only by their toxicity and unpleasant odors but also by creating smog. Organic solvents are further released during oven baking operations on coatings and are carried from the baking oven to the atmosphere in the form of exhaust pollutions. In an attempt to overcome the pollution problems associated with solvent spray-coating techniques, sophisticated recovery and after burner systems are employed to trap or burn solvent effluents. The cost of installation and operation of such systems and incinerators to dispose of the waste solvent is a very sizable expense.

While the more recent electrostatic powder-coating technique employs no solvent, such a technique involves the use of costly coating material. This method operates on the principle of transporting a finely divided dry powder and for this purpose, bulk resin must be crushed to a fine, rather uniform particle size and mixed with pigments, fillers, hardeners and the like by sophisticated and rather expensive crushing and mixing equipment. Such equipment includes ball mills, hammer mills, kibblers, extruders, kneaders, and other compounding equipment; filters, sieves, conveyors and the like, all of which are employed to process the coating material into a dry powder form suitable for transportation to the atomizing equipment. But still the technical material problems remain in the electrostatic powder-coating technique because it is difficult to provide satisfactory dry powders which have long shelf-lives for handling and spraying, etc. and these problems diminish the solventless appeal of the powder-coating techniques.

An important part of this brief overview of background for this invention is the sophistication in coating materials that has occurred. The search for a high quality polymeric coating material which can be applied without air pollution has been extensive. However, for instance in the spray application of molten polymers or concentrated polymeric solutions, techniques have not advanced to any significant extent because of the formulators' lack of understanding of atomizing mechanisms and by a similar lack of understanding by spray equipment designers as to the nature of high polymeric liquids. There have been many studies undertaken which relate to theoretical energies required, and the relationship of viscosity, surface tension, temperature, etc., of the liquid coatings. However, for use with high polymers and their concentrated solutions, the viscosity measurements are relatively meaningless and often misleading as comparative indicators of the relative ease or difficulty in atomizing two different polymeric liquids. Rather, polymeric liquids are vastly different from Newtonian liquids. They are somewhat elastic, resist deformation by rapidly applied forces and exhibit varying degrees of spring-back or recoil. Presently there are no practical instrumentations capable of evaluating these values of polymeric liquids so that the forecast of their atomizability or energy required to convey them to a substrate can be achieved. At each stage of the process for atomizing and conveying a polymeric liquid to a surface, the liquid resists high speed deformation. Therefore, it may be understood why solvent additions have been employed because they have the effect of separating the polymeric molecules and facilitating their relative movement to make the solution easier to deform at high speeds and thus easier to atomize. However, even after considerable effort over many years has been expended to prepare high solids coating compositions containing about 50% by volume of polymeric and pigmentary solids, still little success has been achieved, and from 15 to 40% by volume of liquid solvent components is necessary in spite of these efforts.

In summary, the coating and finishing industry is still seeking ways and means to apply polymeric coating compositions without emission of polluting solvents and vapors, and with minimum expenditure of energy per unit of coating material applied. There is a substantial need for efficient and economical processes which are devoid of the problems associated with known techniques for coating surfaces.

SUMMARY OF THE INVENTION

This invention is directed to foamable thermosetting resin compositions and to coating surfaces by a method which eliminates many of the disadvantages associated with the coating methods of the prior art discussed above from pollution, equipment, materials, energy, labor and cost standpoints. In one of its aspects, this invention eliminates the need for solvents in paints and coating formulations or reduces solvent content to minimal amounts heretofore unoperable. In another of its features, this invention enables high molecular weight thermosetting polymeric compositions to be employed as coatings materials which heretofore have been incapable of such utility. Furthermore, this invention has utility in nearly all coating processes where film-forming solids are conveyed from a bulk state to a surface for protection or decoration. In a particular respect, spray-coating techniques, which have been materially hampered by environmental and raw material problems, are significantly advanced by the improved methods of this invention. These objectives, advantages and solutions to existing problems will become apparent in the detailed description of this invention.

Foamable thermosetting resin compositions of this invention comprise a curable thermosetting resin having a free hydroxyl group or a carboxyl group, a curing agent consisting of a lower ($C_1$–$C_4$) alkoxylated amine for reaction with the resin hydroxyl or carboxyl group and a liquid blowing agent consisting of a $C_1$–$C_4$ alkanol which is also a by-product of the thermosetting reaction of said resin. The resins are from a class of acrylic, epoxy, polyester and polyurethane resins which have a free hydroxyl or carboxyl group for cross-linking or thermosetting reaction with the alkoxylated amine curing agents. The curing agents are $C_1$–$C_4$ alkoxylated amines, preferably hexamethylmethoxy melamine and tetramethylmethoxy urea.

The use of foamable thermosetting coating compositions of this invention enables the obtainment of certain unique advantages. Such advantages are exemplified by polyester resin coating compositions which are most widely employed in the industry. When a polyester resin is cured or cross-linked with hexamethoxymethyl melamine, or a similar curing agent, such as tetramethoxymethyl urea, methanol is the by-product of the reaction. In a preferred practice of this invention, methanol is introduced in a very minor amount as the foaming agent. Methanol has a very favorable vapor pressure for foaming of polyester resins and it is sufficiently soluble to produce a high quality foam formation. In a broader aspect, this invention therefore employs a liquid blowing agent which is also a by-product of the thermosetting resin reaction and, thus, also by suppression of that reaction enables control of curing times while the foam coating is being conveyed and finished on a surface. This is advantageous in allowing for additional hold-up, storage and processing times of thermosetting coating compositions.

A unique method of processing thermosetting resin coating compositions is also provided by this invention. The method includes foaming the above described thermosetting resin, curing agent and blowing agent compositions wherein the blowing agent is also a by-product of the thermosetting reaction. The thermosetting reaction of the foamable composition is controlled by the addition of a lower alkanol which is the by-product of the thermosetting reaction. The foamed thermosetting composition is then conveyed to a surface and finished on that surface with the processing advantages mentioned above. These unique aspects and other advantages of this invention will be further understood with reference to the following detailed description.

DETAILED DESCRIPTION

There are a number of methods of conveying the foamable thermosetting coating solids to a surface as disclosed in the above cited related U.S. Pat. No. 4,247,581 upon which this application is based and this patent disclosure is incorporated herein by reference. One method of coating thermosetting polymeric materials is to first place them in an energy form for small particle formation by converting them to a foamed state. This use of energized, relatively stable foam in coating applications is considered unique. Heretofore, foam has been suppressed during manufacture, pigmenting, tinting and application of paint or coating materials. In complete contrast, in one of its aspects, this invention is predicated in part upon the discovery that relatively stable thermosetting resin foams may be utilized to overcome a number of major problems which have existed in the finishing and coating industry for many decades. Furthermore, such relatively stable foam techniques, as herein described, enable the elimination of solvents, heretofore considered to be essential components of most coating compositions. The method of coating a surface with a film-forming thermosetting solid according to this invention is capable of practice with non-volatile film-forming solids or substantially non-volatile solids so that savings of materials may be made by the elimination or nearly complete reduction of solvents. Furthermore, in addition to solvent material savings, the energy involved in eliminating such solvents during handling, atomization or deposition and curing of the coating composition is saved and the demand for petroleum solvent sources is relieved. Significantly, the health and safety hazards heretofore associated with the solvents of prior coating techniques are overcome.

In another form, the method of this invention enables high polymeric thermosetting materials to be coated by first foaming liquid compositions containing film-forming solids and a specific liquid blowing agent, then conveying the foam toward a surface and, upon foam disintegration, forming a film of solids on the surface. Heretofore, when an attempt was made to form high solids coating compositions from polymers, relatively low molecular weight materials had to be employed which would sag and run rendering them virtually useless for practical purposes. Such sagging problems are overcome by this invention which enables use of polymeric compositions having viscosities in excess of 300 centipoises, in the range of 300–30,000 centipoises, at application temperatures for coating substrates by such methods as atomization and spraying, roll coating, dip coating and the like. Heretofore, with known techniques, viscosity levels had to be maintained below about 300 centipoises in order to achieve atomization or coating. Moreover, the method of this invention is accomplished without resort to quantities of polluting solvents or water requiring large quantities of energy for evaporation.

The foam according to this invention may be of two morphological types, i.e., "sphere-foam" or "polyhedron-foam". Other names given to these types of foams, by reference in the literature are kugelschaum and polyederschaum; see article entitled "Bubbles and Foam" by Sydney Ross, "Chemistry and Physics of Interfaces, Vol. II" by Am. Chem. Soc., Copyright 1971, pp 15–25, ISBN 8412-0110-2. Herein, these foams are simply called "K-foam" and "P-foam". The sphere-foam consists of spherical bubbles widely separated from each other by liquid underneath the surface thereof, whereas the polyhedron-foam consists of bubbles that are nearly polyhedral in shape with thin, curved or plane films of liquid between them. In its most preferred form, this invention is directed to the utilization of the polyhedron-foam. In the polyhedron-foam, the thin films provide considerable surface energy, and such may be disintegrated or sheared by the force of the flow of, for example, an atomizing fluid. Thus, this invention makes use of the surface energy that has been provided so that the film-forming solids will be in a thin film for disintegration or atomization by the shearing flow of a pressurized atomizing fluid. The atomizing force may be an external fluid such as air, or air jets, which shear the foam. On the other hand, the atomizing force may be provided by an internal hydraulic fluid.

In an essential respect, energy is stored in the film-forming solids in a foamed state before atomization so that materials, even with high viscosity, are placed in very thin films surrounding a gas or vapor to create the surface that is demanded for spraying of viscous polymeric materials. Therefore, the P-foam presents the most advantageous surface area deployment. Of course, it is to be understood that the principles of operation of this invention apply to the K-foam as well, but the surface area and energy presented in such foam are not optimized as in P-foam. Also, it should be understood that the K-foam may provide a transitional stage to the P-foam wherein the polymeric material is thinned out to its utmost form for disintegration and atomization for conveyance by spraying to a substrate. In contrast to the preferred P-foam herein, generally all long-lived foams that are of interest for their industrial application are desired in the K-form, and formulations are so developed to produce and retain it, as in the foamed-polymers, rubbers, shaving creams, whipped creams, etc.

In the case of prior polymeric structural, rigid and elastic foams, from the standpoint of the ratio of the volume occupied after foaming to the volume occupied before foaming, present practice of the known art operates at perhaps an upper limit of about 100:1. Furthermore, by comparison in U.S. Pat. No. 3,764,069 wherein gas is injected into a low viscosity liquid paint formulation to atomize same, the air to liquid mass ratio in the froth is approximately equivalent to a range of about 100:1 to 1600:1 from the standpoint of the ratio of volume occupied after frothing to volume occupied before frothing. In contrast, in the practice of this invention, the ratio of volume occupied after foaming to volume occupied before foaming ranges up to about 50:1, preferably from about 2:1 to 10:1 by volume. Thus, in spite of the large differences in such ratios according to the practice of this invention, in comparison to the ratios of the prior art, the liquid polymeric phase is subdivided into small cells whereby sufficient energy is supplied to create and insure adequate atomization. Whereas, according to the ratios defined in such prior art, not enough time-stability is achieved to carry out atomization notwithstanding the nature of the viscous coating material.

In another of its objectives, by the method of this invention highly viscous thermosetting coating compositions are placed in a specific form for handling, conveying and coating into thin films by introducing a $C_1$–$C_4$ alkanol blowing agent material as a diluent in foam form to reduce their viscosity and to permit them to undergo such operations. Therefore, in comparison to prior techniques, this invention utilizes the concept of enhancing the controlled flowability of highly viscous materials by foam formation to achieve significant results and overcome problems long outstanding in the art of coating materials. At the same time the thermosetting reaction is controlled by the presence of the alcohol additive to the thermosetting foamable composition.

It will be understood that the liquid foamed compositions for surface coating according to this invention comprise liquid film-forming or polymeric components. Thus, the polymeric component may range from a liquid, to a semi-solid paste, to solid under normal conditions. Thus, the foams, while in a liquid state, may contain either solid or liquid film-forming components. The liquid state of the foam, or film-forming solids, may be enhanced by the application of temperature and, as such, hot melt foam compositions may be used according to the coating process of this invention. In the hot melt form or ambient liquid form, the foam thus contains thermosetting resinous compositions. Thermosetting coating resin compositions used in the practice of this invention provide desirable certain end properties achieved by such compositions in coating surfaces. For instance, thermoset compositions offer hardness required for many coating uses and, further, upon curing to their cross-linked high molecular weight state, resist solvent attack, and the like. For instance, a foam is formed by the action of heat, conveyed to a substrate either by spraying or other transfer, and then finished if necessary by heating. In this process, it has ben found that thermosetting components may be employed in the formation of the foam and, even though polymerization is occurring during periods of foaming, conveyance and deposition upon the surface, the foam state still permits handling and processing to a finished coating on a surface.

Depending upon the method of coating conveyance, the thermosetting composition will undergo different mechanisms of disintegration and film-forming upon a substrate. Where atomization and spraying are the modes of conveyance, foam disintegration will be initiated and occur prior to film-forming solids being deposited upon the substrate. As explained above, and in this instance, the ease of atomization of such high polymeric liquids is accomplished by reason of the energy that is stored in the liquid surface of the foam bubbles. In another form, however, foams of high polymeric solids may first be deposited upon a substrate by a suitable technique and disintegrated thereon to form a continuous film coating from the film-forming solids. It is also understood that in the conveyance, such as by atomizing and spraying, liquid polymer film-forming agent may become either tacky or powdered particles after or while being conveyed from the bulk state. These particles may subsequently be applied to the substrate by electrostatic forces, or otherwise, and then even heated to form a continuous film on the substrate.

In a preferred form, this invention enables thermosetting polymeric compositions of high molecular weight to be conveyed to substrates by a most commonly employed technique of atomization by first forming a liquid foam composition, followed by disintegration and spraying. The conveyance technique may be spraying with compressed air, hydraulic or airless methods, electrostatic techniques, etc., all of which involve predominate or complete disintegration of the foam prior to deposition upon the substrate. Other methods of conveyance or application of the foamable compositions of this invention include roll coating, dip coating, extrusion coating, curtain coating, and the like which involve the disintegration or destruction of the foam after deposition upon the coated surface. Generically, in all of these coating techniques, there is involved the preparation and conveyance of a coating composition in a relatively stable foamed liquid state for deposition of that coating composition upon a substrate to be film coated for usually decorative or protective purposes. Of course, the application of the principles of this invention are not to be limited to the techniques just noted, rather, other methods of application or conveyance in both domestic and industrial areas include brushes, tumbling, or coil coating, to mention a few.

In order to provide a liquid foam composition, the film-forming polymer as mentioned may be a liquid, semi-solid or solid form at normal or room conditions. Polymeric compositions can be obtained in liquid form, without the addition of solvents or other liquid diluents as by melting, for example. Thus, the foamable thermosetting composition is formed in the hot melt state with an alkanol blowing agent which is also the by-product of the thermosetting reaction. Common resins of the industrial coatings industry without solvents are therefore suitable including syrups of methacrylates, acrylates and copolymers thereof, polyester resins, polyurethanes, epoxies and the like. The coating and finishing resins presently primarily in use are alkyd polyester resins or polyesters. In this regard, the term "alkyd polyester" resin is intended to include those resins which are modified polyester resins, usually oil modified resins. And "polyester resins" are the synthetic resins derived from polyfunctional alcohols and acids. Herein, the term polyester resin refers to both. The next most important resin for industrial coatings of the present industry is made up of mainly acrylic polymers and copolymers, with the balance comprising epoxies, polyurethanes, and other similar resins. Therefore, it is to be understood that the film-forming component of the liquid compositions of this invention include a wide variety of polymeric components of the type just mentioned and well understood by those skilled in the arts of the paint and coatings industry. The principal polymeric composition which may be employed in any of the methods defined above depends upon the end use of the coating, the coating method employed, and so forth as will be well understood to a person of ordinary skill in the art. Sources existing in the surface coatings literature to illustrate the specific types of coatings for particular domestic or industrial applications include the handbook of "Surface Coatings" prepared by the Oil and Color Chemists' Association, Australia, in conjunction with the Australian Paint Manufacturers' Federation, the New South Wales University Press, 1974; Treatise on Coatings, Vol. 4 (in two parts entitled "Formulations, Part I", edited by R. R. Myers and J. S. Long, Marcel Dekker, Inc., 1975); and Paint Finishing in Industry by A. A. B. Harvey, Second Edition, Robert Draper, Great Britain (1967). These sources are included herein by reference for more detailed disclosures of compositions and coating techniques.

"Polyurethane" is a generic term. It designates a polymer wherein the repeating unit is a urethane linkage. The latter is obtained by reaction of a polyisocyanate with compounds containing two or more hydroxyl groups per molecule. Polyurethanes (or simply urethanes) have been used for about thirty years as surface coating media.

The essential components of all urethane based products is the isocyanate. Isocyanates contain one or more —N=C=O groups. This group reacts with organic compounds containing an active hydrogen atom, such as —OH,—$NH_2$—COOH radicals. Some materials that have these types of radicals are polyesters, castor oil, alcohols, amines. The most important reaction is with hydroxyl-bearing components.

$$R{-}NCO + R^1{-}OH \longrightarrow R{-}NH{-}\overset{O}{\overset{\|}{C}}{-}O{-}R^1$$

By using polyfunctional reactants, that is, by reacting compounds containing two or more isocyanate groups with compounds containing two or more hydroxyl groups, it is possible to build polymeric materials.

$$HO{-}R{-}OH + OCN{-}R^1{-}NCO \longrightarrow HO{-}R({-}O{-}\overset{O}{\overset{\|}{C}}{-}NH{-})R^1{-}NCO$$

Moisture and carboxyl groups are always present in a polyol to some extent. The isocyanate will react with them. Reaction with acid:

$$HOOC{-}R{-}COOH + OCN{-}R1\text{-}NCO$$

$$HOOC{-}R{-}\overset{O}{\overset{\|}{C}}{-}O{-}\overset{O}{\overset{\|}{C}}{-}\overset{H}{\overset{|}{N}}{-}R^1{-}NCO$$

$$\downarrow$$

$$HOOC{-}R{-}\overset{O}{\overset{\|}{C}}{-}\overset{H}{\overset{|}{N}}{-}R^1{-}NOC + CO_2$$

Other reactions undergone by the isocyanate group will also influence the properties of the cured resin to various extents.

Many isocyanates can be used to produce polyurethanes. The first commercially available isocyanate was tolylene diisocyanate (TDI). It is the prime isocyanate used for flexible foams and its reaction products, adducts and prepolymers with polyols, polyesters, are used for surface coatings. TDI is available in two isomeric forms, 2,4- and 2,6-tolylene diisocyanate; the former is more reactive.

Free TDI, because of its toxicity, finds little application in the paint industry. It is usually pre-reacted in some way to overcome the toxicity and also to improve film properties. The most extensively used pre-reacted type is the reaction product with a polyol, usually a triol or triolidiol mixture. Isocyanurate derivatives to TDI can form rapid-drying hard resins. They are usually formulated with linear polyols to reduce the degree of cross-linking. The MDI (4,4'-diphenylmethane diisocyanate) of commerce is a crude product of a mixture of homologues of diphenylmethane-diisocyanate, primarily, the 4,4' isomer.

The range of properties of polyurethane coatings can be extended by suing aliphatic or cycloaliphatic isocyanates instead of aromatic isocyanates. Among the aliphatic isocyanates, hexamethylene diisocyanate is used most commonly. The reaction rate of aliphatic isocyanates with polyols is slower than the reaction rate of aromatic isocyanates and so catalysts such as zinc octoate, dibutyl tin dilaurate are normally used.

The type of hydroxyl component used to react with the isocyanate and its ratio to the isocyanate will also determine the properties of the final product. Most commonly, saturated polyesters of fairly low acid value (<10 mg KOH/g) and of fairly high hydroxyl value (100 to 300 mg KOH/g) are used. Both hydroxy-terminated polyethers, castor oil and alkyd resins of the castor or coconut short oil type can also be reacted with isocyanates.

The ratio of diols, triols and higher functional polyols may be varied; another variable is their chain length, that is, their molecular weight. These two variables control the cross-linking density, which exhibits the greatest influence on film properties. Highly branched and low molecular weight polyols give high cross-linking desities and, therefore, brittle but chemical- and solvent-resistant films. More linear and higher molecular weight polyols give softer, more flexible, but non-inert films. Usually a compromise between the two extremes is accepted. The film properties of all classes of polyurethanes are affected by the NCO/OH ratio. Higher ratios give increased hardness and faster cure, and they can give better weather resistance. However, there is also reduced flexibility and increased non-cross-linked isocyanate radicals which will eventually react with atmospheric moisture.

Whether the type of polyol used is a polyester or a polyether it will influence the chemical resistance. Generally, polyesters show a greater resistance to acids and organic solvents, while polyether films are more resistant to alkalis and water. Other polymers such as hydroxyl containing acrylic and vinyl chloride resins can also be reacted with isocyanates to obtain specific properties.

Therefore, the polymeric compositions which may be chosen for utilization in this invention are of a wide variety and the viscosity of such compositions, with or without solvents or diluents, may be varied over a wide range. Typically, the viscosity may be in the range up to, for example, 30,000 centipoises as measured by ASTMD3236 (Thermosel Viscosity) of th film-forming material through either variation of temperature, molecular weights or both. As noted before, prior art coating compositions in order to achieve atomization by prior art techniques, use polymer solutions having viscosities usually not in excess of 300 centipoises at application temperatures in order to achieve results of satisfactory quality. However, by employing the techniques of this invention, polymeric compositions having very high viscosities may be employed. Such polymeric compositions thus may comprise substantially non-volatile solids or even 100% solids so that little or no pollution occurs either in the handling, conveyance or coating of the materials onto various articles.

In another form of the invention, relatively stable foams are formed to provide polymeric coating liquids and yet to eliminate the possibility of bubbles remaining under the surface of the coating material to thus mar its appearance and limit the life and protection afforded by the coating. In this aspect, it is an objective to prevent permanent bubbles from remaining in the polymeric coating on the substrate even under conditions favoring relative stable foam formation. For this purpose, a polymeric composition is obtained in liquid form without addition of solvents are disclosed above. Another liquid or combination of liquids is then chosen such that (a) the boiling point of this liquid at atmospheric pressure lies near the ring and ball softening point of the resin and (b) the saturation solubility of the liquid at its boiling point in the resin does not exceed 5% by weight of the resin. The amount of the chosen liquid as a blowing agent is chosen from about 0.05% to 5%, preferably 0.1% to 1%, by weight of the resin. It will be understood that if the liquid is too soluble, then foaming will not satisfactorily occur due to loss of blowing agent by diffusion. Furthermore, if an excessive amount of the liquid is employed, foaming may not occur. Thus, the range of liquid to resin weight will be governed by these factors to achieve the desired results as will be understood by one of skill in view of this description; and FIG. 2 hereinafter referred to illustrates the formation of foams by liquid blowing agents. Referring to FIG. 2 for the generalized situation, the uniform mixture of the resin with liquid blowing agents is heated to a temperature substantially above the boiling point of the liquid and simultaneously pressurized to a pressure at least high enough that it exceeds the vapor pressure of the liquid at that temperature. This pressurized mixture of resin and blowing agent is then pumped through temperature and pressure controlled tubes to the location of application to a substrate. Whereupon, the mixture of components is allowed to foam by release of pressure to atmospheric pressure or below with the temperature maintained above the boiling point of the liquid. This foam may then of course be applied to the substrate by dipping, spray atomization, roll coating, curtain coating, flow coating, wave-contact coating, etc. During conveyance or thereafter, as explained above, the foam is allowed to fall in temperature below the boiling point of the blowing liquid at atmospheric pressure whereupon the bubbles of the foam disappear either by evaporation and/or condensation of the liquid blowing agent. This process will be further exemplified hereinafter with reference to specific examples.

In addition to the above mentioned variability of thermosetting resin or polymeric formulations suitable for coating purposes, a number of different types of $C_1$–$C_4$ alkanol foaming agents may be employed in the method according to this invention. Such lower alkanols are derived as a by-product of the thermosetting reaction with the free hydroxyl group of the resin. Exemplary liquid foaming agents of the type described above are isopropanol, methanol, propanol, butanol and ethanol. A number of alkoxylated amine compounds may be employed to provide the alkanol blowing agent in order to foam a liquid coating agent according to the principles of this invention. Included in such lower alkoxylated amines are tetramethylmethoxy urea melamine and hexamethylmethoxy urea. Other $C_1$–$C_4$ or lower alkoxylated amines may be derived from the group of amines including ethylene diamine, diethylene triamine, triethylene tetramine acetate, trimethylene diamine, tetramethylene diamine, hexamethylene diamine, decamethylene diamine and tetraethylene pentamine.

It is also to be understood that other additives may be employed in the coating compositions as is illustrated by the above comprehensive references upon formulation. These include pigments, carriers, driers, catalysts, flow control additives or the like, many of which, pigments for example, materially facilitate a clean break-up and disintegration of the foam. In this connection, reference is also made to the copending application of Walter H. Cobbs et al, Ser. No. 719,338, filed Apr. 27, 1977, now U.S. Pat. No. 4,247,581, issued Jan. 27, 1981, for a disclosure of surfactants which may be employed to provide stabilized molten foam compositions by the addition of a surfactant in a sufficient stabilizing amount. In this regard, it will be understood that a surfactant may be employed to form a stabilized foam of P or K form for utility in this invention, as developed in detail above.

The principles of this invention will be further understood with reference to the following detailed examples and the drawing in which.

Figure 1:
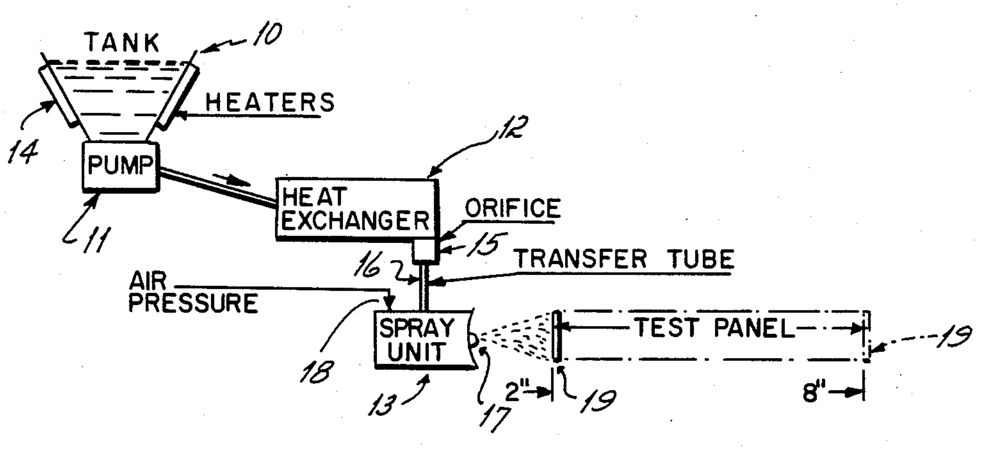
FIG. 1 is a schematic of a suitable apparatus for performing the foam coating method of this invention by a hot melt liquid blown technique.
Figure 2:
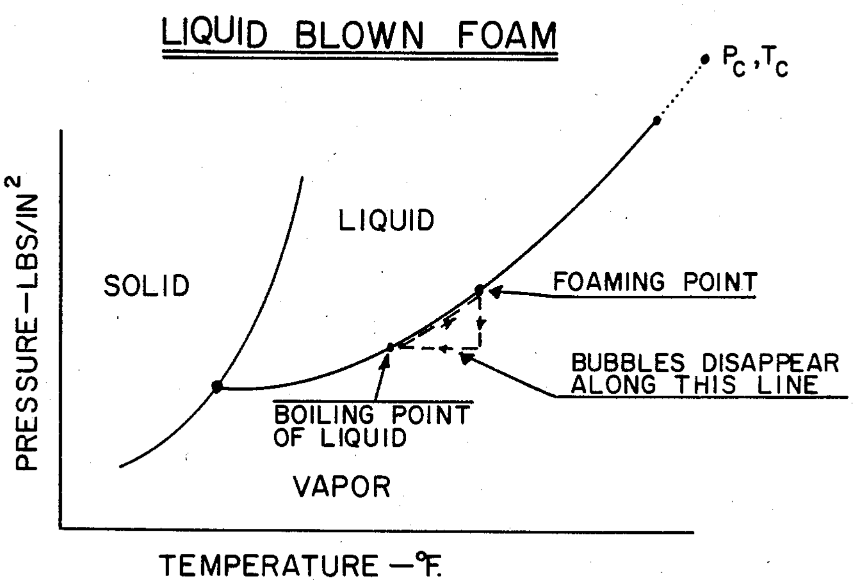
FIG. 2 illustrates the formation of foams by liquid blowing agents.

Referring to FIG. 1 of the drawing, an apparatus for performing the method is shown. The apparatus employs a tank 10 or funnel grid for containing the paint composition having associated therewith a pump 11. The pump 11 illustrated is a typical air motor gear drive pump, however, any pump capable of providing sufficient pressure, up to 100 pounds, to pump the paint sample through the heat exchanger 12 on to the spray unit 13 is suitable. The apparatus of the FIG. 1 was operated for methanol foaming of a polyester resin paint composition of Example 1.

EXAMPLE 1

| | | |
|---|---|---|
| (1) | Polyester Resin | 415.5 grams |
| (2) | $TiO_2$ | 475.0 grams |
| (3) | hexamethyl-methoxy melamine | 178.1 grams |
| (4) | Silicone surfactant | 1.8 grams |
| (5) | Catalyst | 3.0 grams |
| (6) | Methanol (5% of resin solids) | 20.8 grams |
| | | 1094.2 grams |

The polyester resin employed above was 100% solids consisting essentially of adipic and phthalic acids polymerized with propylene glycol and trimethylolpropane. The viscosity of the polyester resin formula without methanol and catalyst was determined over the range of about 125° F. to about 225° F. to be about 45,000 to 4,000 centipoises.

The paint composition was introduced into the tank at about 77° F. The tank heaters 14 were operated to raise the temperature to allow the high viscosity paint composition to flow into the intake of the pump 11, i.e., about 130° F. From the pump, the paint composition passed under pressure through the in-line heat exchanger 12 to raise its temperature to 220° F., then through a 0.012 to 0.025 inch orifice 15 where it expanded to a foam in a ratio from about 2/1 to 8/1 in volume, and then via a transfer tube 16 to the entrance port of a spray unit 13, for instance a Model 61 Binks air spray unit. From the nozzle 17 of unit 13 (0.052 inch diameter) the foam issued at a temperature of 220° F. at a rate of about 2 oz. per minute. A pressure of 40–50 psig was applied to the air intake 18 of unit 13, whereupon the foam paint composition was atomized and conveyed to a test panel 19 of steel plate.

After baking the test panel 19 in an oven at 350° F. for 25 minutes, the thickness of the coating was found to be 0.8–1.0 mils using a magnetic gage. Pictures taken by flash photography show the atomization achieved at intervals of 2 inches from the nozzle outward to a distance of 8 inches from the nozzle. Cuts through the spray at a distance of 8 inches from the nozzle were made on black paper and showed a uniform distribution of fine paint composition particles. A stream of the foam was also photographed under a low power microscope and, at a point immediately outside the nozzle 17, exhibited a cellular P-structure plus accompanying K-structures.

A portion of foamed formulation from the nozzle was run onto a preheated metal panel (200° F.); a preheated hand-roller (200° F.) was used to roll out the foam into a film measuring 0.5 mils in thickness.

EXAMPLE 2

72.3% Epon 1001 (Shell Chemical Co.)
4.5% Epon 828 (Shell Chemical Co.)
18.9% Hexamethylmethoxy melamine
3.4% Methanol
0.9% Catalyst The above formulation (percent by weight) was prepared by melting the Epon 1001 resin at about 200° F. containing in admixture Epon 828. The hexamethylmethoxy melamine was added to the resin mixture with agitation at 150°–200° F. The mixture was allowed then to cool to below about 140° F. before the addition of methanol, whereupon the methanol was slowly added under continuous agitation. The catalyst was finally mixed into the resultant resin composition. Prior to the addition of the catalyst and methanol, the viscosity of this clear enamel formula was 2090 centipoises by ASTM D3236 at 200° F. This formulation was pumped through the heat exchanger of the apparatus illustrated in FIG. 1 modified to allow material to flow out of tube 16 onto preheated test metal panels. The material foamed onto the panels copiously. The foam was easily rolled out as a clear thin film approximately 0.5 mil thick using a preheated hand roller. A hard clear film coating remained after baking for 20 minutes at 350° F. Another portion of this formulation was sprayed through the apparatus of FIG. 1 at a nozzle temperature of 219° F. at about 3 oz./min. Atomizations were excellent and test panels were made and baked out at 350° F. for 30 minutes.

In view of the above detailed description and operating examples, other modifications and embodiments of the practice of this invention may be employed without departing from the scope hereof.

What is claimed is:

1. A foamable thermosetting polyurethane resin composition comprising a curable thermosetting polyurethane resin having a free hydroxyl group or carboxyl group, a curing agent consisting of $C_1$–$C_4$ alkoxylated amine for reaction with said hydroxyl or carboxyl group, and a liquid blowing agent consisting of a $C_1$–$C_4$ alkanol as the sole blowing agent which is also a by-product of the thermosetting reaction of said resin with said curing agent.

2. The composition of claim 1 wherein said blowing agent is methanol.

3. The composition of claim 2 wherein said resin is a polyester condensation product of a polyol and a polyfunctional carboxylic acid.

4. The composition of claim 1 wherein the amine is selected from the group of melamine, urea and derivatives thereof.

5. The composition of claim 4 wherein the blowing agent is a methanol.

6. The composition of claim 3 wherein said curing agent is selected from the group consisting of hexamethylmethoxy melamine and tetramethylmethoxy urea.

* * * * *